March 26, 1935.  W. L. MERRILL  1,995,318
DISHWASHING APPARATUS
Filed Dec. 24, 1931
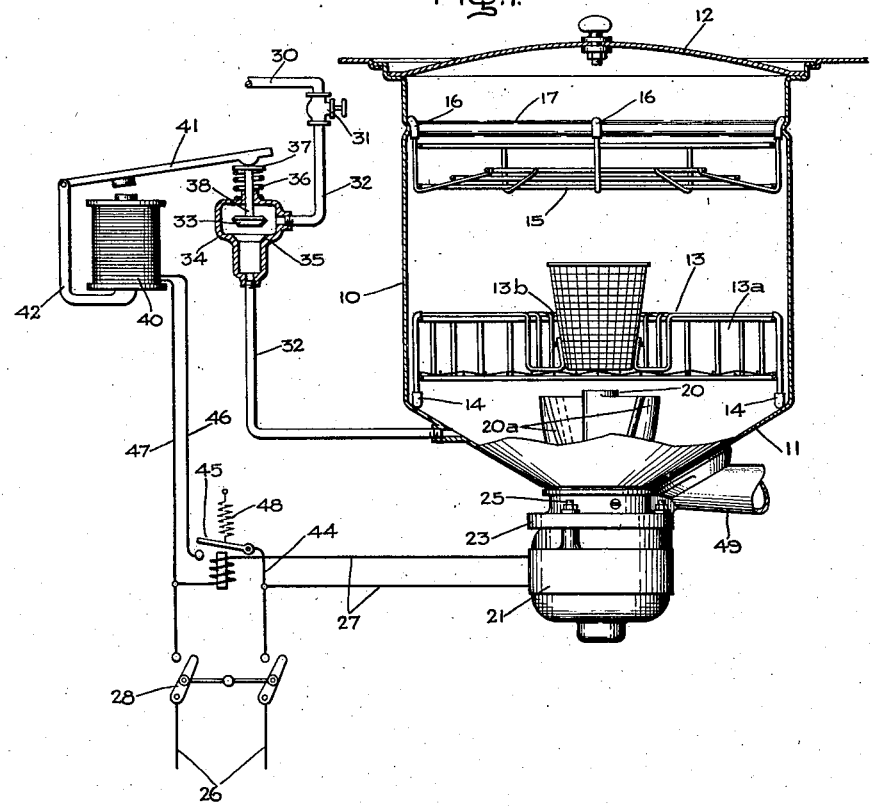
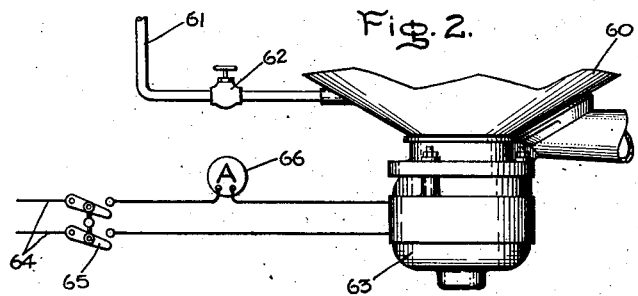
Inventor:
Wilbur L. Merrill,
by Charles E. Tullar
His Attorney.

Patented Mar. 26, 1935

1,995,318

UNITED STATES PATENT OFFICE 1,995,318

DISHWASHING APPARATUS

Wilbur L. Merrill, Scotia, N. Y., assignor to General Electric Company, a corporation of New York Application December 24, 1931, Serial No. 582,959

11 Claims. (Cl. 141—9)

My invention relates to dishwashing apparatus and has for its object the provision of improved apparatus of this character.

More specifically, my invention relates to dishwashing apparatus wherein a cleansing fluid, such as water, is circulated or hurled through the washing chamber or vat by suitable power driven means, such as a motor driven impeller, and has as one of its objects the provision of improved means for supplying the washing vat with a predetermined quantity of cleansing water so that the most efficient cleansing action will be effected.

In carrying out my invention, I provide suitable means, such as an electric motor, for driving the impeller. In order to supply the washing chamber or vat with the proper quantity of cleansing fluid, suitable conduit means are provided for conveying the cleansing fluid, which for example may be water, to the washing chamber. This conduit means is controlled by valve means which in turn is controlled in accordance with an operating condition of the impeller, such as the load imposed thereon by the water admitted to the vat, so as to close the supply conduit when a predetermined quantity of water has been supplied to the vat. In one form of my invention, this valve means is controlled responsively to a condition of operation of the impeller driving motor, which condition will be a measure of the load imposed on the impeller by the fluid supplied to the vat. Preferably, the conduit controlling valve means will be controlled responsively to the magnitude of the load current supplied to operate the impeller driving motor.

If desired, a suitable indicating device operable responsively to the load imposed on the impeller by the water supplied to the vat may be provided so as to give a signal when the proper amount has been received in the vat. This signal device may be used in connection with the above-mentioned automatically controlled valve means as a safeguard, or it may be used in connection with a manually controlled valve. It will be understood that in this latter case the attendant will shut off the supply of fluid when the proper amount, as shown by the indicator, has been supplied to the vat.

This indicating means may be a suitable electro-responsive device operated in accordance with the magnitude of the current supplied to operate the impeller driving motor.

For a more complete understanding of my invention reference should be had to the accompanying drawing in which Fig. 1 is a vertical elevation of a dishwashing machine embodying my invention, portions being shown in section so as to illustrate certain structural details, and Fig. 2 is a fragmentary view illustrating a modified form of my invention.

Referring to the drawing, I have shown my invention in one form in connection with a dishwashing machine comprising an upright cylindrical washing chamber or vat 10 for receiving dishes and like utensils to be cleansed and also some suitable washing fluid, such as hot cleansing water. The vat 10 is provided with an inverted frustro-conical bottom wall 11, preferably formed integrally with the side walls of the vat. A suitable removable cover 12 is provided for the vat 10. While the vat together with its bottom wall and cover may be made of any suitable material, I prefer to form them from suitable sheet metal, such as a rust-resisting steel, which preferably will be plated or enameled.

A suitable utensil supporting openwork tray or basket 13 is provided in the lower portion of the vat 10 and is removably supported therein upon the marginal edge portions of the bottom wall 11 by means of legs 14, and a suitable openwork utensil supporting tray 15 is arranged in the upper portion of the vat, this latter tray having at its upper edge suitable supporting arms 16 arranged when the tray is in position in the vat to engage and rest upon a suitable ledge 17 formed in the vat. This ledge may be and as shown is formed as an inwardly projecting bead shaped from the material forming the side walls of the vat.

While these trays 13 and 15 may have any suitable well-known construction, the lower tray preferably will be provided with two compartments 13a and 13b arranged substantially concentrically of each other, the outer compartment 13a serving to receive platters, plates, saucers, side dishes, shallow bowls and like utensils, while the inner compartment 13b is utilized for receiving knives, forks, silverware, etc.; the upper basket 15 preferably will be arranged to receive glasses, bowls, cups, etc.

It will be understood that these trays 13 and 15 can easily be lifted and so can be loaded or unloaded in or out of the vat as is most convenient.

In the lower portion of the vat 10 and preferably arranged so as to be substantially embraced by the bottom wall 11 is a suitable impeller 20 which preferably will be driven by a suitable electric motor 21.

It will be understood that the impeller will be provided with blades 20a which may have any suitable shape, the important feature being that the blades be given a shape such that the cleansing fluid in the lower portion of the vat be thrown upwardly and outwardly in an efficient manner through the dish supporting trays 13 and 15 by the rotary motion of the impeller. The impeller will be formed from some suitable material, such as cast aluminum, or pressed steel.

The electric motor 21 is supported by means of a frame 23. As shown, the motor is secured to the frame 23 by means of suitable bolts 25 so that it is positioned vertically and has its shaft substantially coaxial with the vertical axis of the vat.

The shaft of the motor extends upwardly through an opening provided for it in the bottom wall into the vat where a suitable mechanical driving connection is provided between the shaft and the impeller 20. It is believed to be unnecessary to describe this mechanical connection in detail since it forms no part of my invention. It is believed sufficient to state that it is preferable that the shaft be connected directly to the impeller so that the impeller will be rotated at the same speed as is the motor shaft.

A suitable source of electrical supply 26 is provided for the motor 21, the armature circuit of the motor being connected with the source 26 by means of conductors 27. A suitable control switch 28, as shown, is interposed in the connections between the source 26 and the motor 21.

In order to supply the vat 10 with a cleansing fluid, a source of supply 30 of the particular cleansing fluid is provided. For example, if the cleansing fluid be water, the source of supply 30 will be a supply of water. A suitable manually operable control valve 31 is inserted in the fluid source to control the flow of fluid therefrom. A conduit 32 connects the source of supply 30 with the vat, this conduit, as shown, communicating with the vat through its lower inclined bottom wall 11.

In order to control the flow of fluid from the source 30 and through the conduit 32 to the vat, a valve 33 is provided in the conduit 32. As shown, this valve 33 is arranged in a housing 34 and cooperates with a suitable valve seat 35 provided in the housing. The valve 33 is normally biased to its open position by means of a suitable compression spring 36. As shown, this spring is interposed between the upper wall of the valve housing and a collar 37 arranged on a portion of the valve stem 38 which protrudes from the upper wall of the housing so as to hold the valve in its open position.

The valve 33 is operated to its closed position against the force of its biasing spring 36 by means of an electromagnet 40. The armature 41 of this electromagnet is pivotally secured at one end to a supporting arm 42 provided for it and has its opposite end bearing on the collar or abutment 37 attached to the valve stem 38. As shown, the armature and electromagnet are so arranged that when the operating coil of the magnet is energized the armature will be attracted so as to close the valve, whereas when this coil is deenergized the armature will be released so as to allow the valve to be moved to its open position by its compression spring 36.

The electromagnet 40 is controlled in accordance with the load imposed on the impeller 20 by the water supplied to the vat so as to close the valve 33 when a predetermined quantity of water has been supplied. For this purpose, the electromagnet is controlled responsively to the magnitude of the current supplied to the motor 21, it being understood that this current will increase as the load imposed upon the impeller by the fluid supplied to the vat increases. As shown, the energizing circuit for the electromagnet extends from the right-hand conductor of the supply source 26, through a conductor 44, the contacts of a relay 45, a conductor 46, the operating coil of the electromagnet and thence through a conductor 47 to the left-hand conductor of the supply source 26. The relay 45 is normally biased to its open position by means of a spring 48 and, as shown, the operating coil of the relay is connected in series with the armature circuit of the motor 21 so as to be energized in accordance with the magnitude of the current supplied to the motor. It will be observed that by reason of this arrangement the pull exerted by the operating coil of the relay 45 will be proportional to the load imposed on the impeller in hurling the fluid supplied to the vat 10 upwardly through the dish supporting rack.

It will be understood that when water is being introduced to the vat the load imposed on the impeller and its driving motor will gradually increase as the quantity of water supplied to the vat is increased and that when the current required by the motor to overcome the increasing water resistance to the impeller reaches a predetermined magnitude, the operating coil of the relay 45 will be energized sufficiently to close the relay. This completes the energizing circuit for the electromagnet which thereupon operates the valve 33 so as to shut off the supply of water to the vat.

The relay 45, it will be understood, will be adjusted so that it will close to complete the energizing circuit for the electromagnet 40 when sufficient water has been supplied to the vat for the most efficient washing operation. It will also be understood that when the relay has been closed to complete this energizing circuit, it will remain closed to maintain it until the control switch 28 for the motor 21 has been opened to deenergize the motor. Consequently, the valve 33 will be held in its closed position until the motor has been deenergized.

It will be understood that for a given impeller and for a vat of given shape and proportions, a definite quantity of water is required for the most efficient cleansing action on the dishes supported in the racks 13 and 15. If the quantity supplied be materially more or less than the requisite quantity the cleansing operation will be less efficient. The quantity of water which should be supplied for the most efficient cleansing operation with a given impeller and vat usually will be determined by trial. In any case, it will be understood that for any given type washing machine the quantity of water which will effect the most efficient washing operation will be predetermined so that the relay 45 can be properly adjusted.

The vat 10 is provided with a suitable drainage outlet 49 in its bottom arranged as close to the bottom of the inclined wall of the bottom 11 as is practical. It will be understood that this drainage outlet will be provided with a suitable controlling valve (not shown) so that the vat may be conveniently closed or opened to the drain as desired by the attendant. Thus, for example, the conduit 49 may be provided with a drain valve of the type shown and described in United States Patent No. 1,825,033 to F. A. Walker, dated September 29, 1931.

In the operation of the washing apparatus, it will be understood that the dishes and like utensils to be cleansed will be placed in their respective supporting trays or baskets 13 and 15. As has been pointed out, the utensils may be placed in the trays either with the trays within or without the vat as is most convenient to the attendant. The switch 28 will then be closed so as to complete the energizing circuit for the impeller operating motor 21 which thereupon will begin to rotate.

The valve 31 will then be opened thereby providing communication between the supply conduit 30 and the conduit 32 communicating with the vat. As water flows into the vat from the source 30, the load imposed on the impeller 20 will gradually increase. As the load increases on the impeller the current supplied to the motor 21 likewise will increase until the pull exerted by the operating coil of the relay 45 is sufficient to close it against the force of its biasing spring 48. When this occurs the electromagnet 40 will be energized so as to close the valve 33 thereby shutting off the supply of water to the vat. As has been pointed out above, the relay 45 will be adjusted so as to allow the requisite amount of cleansing water to flow into the vat for the most efficient cleansing operation.

When the dishes have been placed in the vat and the proper amount of water also has been placed in the vat, the impeller will cause the water in the lower portion of the vat to be thoroughly circulated upwardly and outwardly through the openwork dish supporting trays and against the dishes supported therein.

This operation of the impeller will be continued until the dishes have been thoroughly cleansed after which the motor 21 may be deenergized by opening the control switch 28. When the control switch 28 is opened the energizing circuits both for the motor 21 and the electro-magnet 40 will be interrupted, whereby the motor will cease to operate and the electromagnet 40 will allow the valve 33 to move to its open position. It will be understood, of course, that at some suitable time during the washing operation, the attendant will have closed the valve 31 in the supply conduit 30 so that when the valve 33 is opened in response to a deenergization of the electromagnet 40 water will not be allowed to flow into the vat from the source 30.

After the dishes have thus been cleansed, the drain valve (not shown) will be opened so as to allow the soiled water to drain through the outlet 49.

Referring to Fig. 2 of the drawing, I have shown an arrangement whereby the supply of water to the vat is controlled manually, a suitable signal device responsive to the load imposed on the impeller being provided for indicating to the attendant when the requisite quantity of water has been supplied.

The vat 60, only a portion of which is shown in the drawing, is connected with a suitable source of water supply by means of a conduit 61 in which a suitable manually controlled valve 62 is provided. It will be understood that the vat 60 will be arranged substantially as is the vat 10 of Fig. 1 and will be provided with similar dish supporting racks and a similar water circulating impeller.

This impeller is operated by means of a suitable electric motor 63 which is electrically supplied from a suitable source 64. As shown, a control switch 65 is interposed in the connections between the supply source 64 and the motor 63.

As has been pointed out in a previous portion of this specification, suitable signal means is arranged to operate in response to the load imposed on the impeller by the water supplied to the vat so as to give a signal when the proper amount of water has been received in the vat. As shown, this signal means comprises a suitable electroresponsive device 66, shown as an ammeter, connected in the supply connections to the motor 63 so as to respond directly to the magnitude of the current supplied to the motor, and hence in accordance with the load imposed on the water circulating impeller.

In operation, it will be understood that when it is desired to wash dishes which have been placed in the vat 60, the attendant will open the valve 62 so as to allow water to flow from the source 61 into the vat. It will also be understood that the motor 63 will have been energized by the closing of the switch 65 so that while the water is being admitted to the vat the impeller in the vat will be rotated. As the quantity of water admitted to the vat increases, the resistance imposed by the water to the rotation of the impeller will increase and as a result the current demanded by the motor likewise will increase. This increase in current will appear on the instrument 66. When the instrument 66 indicates that the proper amount of water has been supplied to the vat the operator will close the valve 62, and thereafter the washing operation will proceed as has been described in connection with the machine of Fig. 1.

It will be understood that the instrument 66 may be provided with any suitable scale that will conveniently inform the attendant of the quantity of water that is in the vat at any particular time.

It will also be understood that the instrument 66 may be used in connection with the apparatus shown in Fig. 1 as a precautionary device. For example, the instrument 66 may be used to indicate to the attendant just how much water is in the vat 10 so that if for any reason any portion of the automatic water control apparatus should fail to function whereby the water supply is not cut off when it should be, the attendant may manually close the valve 31 to shut off the supply of water to the vat.

What I claim as new and desire to secure by Letters Patent of the United States, is,—

1. Washing apparatus comprising a vat, means for engaging cleansing fluid in said vat so as to circulate it in said vat, a motor for operating said fluid circulating means, a source of fluid supply for said vat, conduit means connecting said source of fluid supply with said vat and means controlling said conduit means operably associated with said motor to respond to a condition of operation thereof which varies as the load imposed upon said motor in operating said fluid circulating means varies when the quantity of fluid in said vat is changed so as to allow fluid to flow to said vat continuously until a predetermined quantity of fluid sufficient for a washing operation has been supplied, whereupon said source of supply is shut off.

2. Washing apparatus comprising a vat, a source of fluid supply for said vat, conduit means between said source of fluid supply and said vat, power operated means for engaging fluid in said vat so as to circulate it in said vat, valve means controlling said conduit means and means operably associated with said fluid circulating means so as to respond to a condition of operation thereof that varies as the quantity of fluid in said vat varies for controlling the operation of said valve means to control the quantity of fluid supplied to said vat from said source.

3. A dishwashing machine comprising a vat, a fluid circulating impeller in said vat, an electric motor connected to operate said impeller, a source of water supply, a conduit between said source and said vat, a valve for controlling the flow of fluid through said conduit, and means operated responsively to an electrical condition in the armature circuit of said motor that varies as the load on said motor varies for controlling the operation of said valve to shut off the supply of water when said load attains a predetermined magnitude.

4. A dishwashing machine comprising a vat, an impeller in said vat arranged to hurl fluid supplied to said vat upwardly and outwardly in said vat, an electric driving motor mechanically connected with said impeller, a source of cleansing fluid supply, a conduit connecting said source of supply with said vat, a valve in said conduit for controlling the flow of fluid from said source to said vat, means for operating said valve to an open position to allow fluid to flow to said vat, an electromagnet arranged to operate said valve to its closed position to shut off the flow of fluid to said vat and means operably associated with said motor so as to respond to the armature current thereof which increases with the increasing load imposed on said impeller when the quantity of water supplied to said vat increases for controlling the energization of said electromagnet to shut said valve only when said current attains a predetermined magnitude, whereby a predetermined quantity of fluid is supplied to said vat before said valve is closed.

5. A dishwashing machine comprising a vat, fluid circulating means in said vat, a driving motor mechanically connected with said fluid circulating means, a source of fluid supply for said vat, conduit means between said source of supply and said vat, means including an electromagnetic device controlling the flow of fluid from said source to said vat through said conduit means, an energizing circuit for said electromagnetic device, a switch controlling said energizing circuit and a second electromagnetic device for operating said switch having an energizing circuit connected in the armature circuit of said motor so that said second electromagnetic device is energized by the armature current of said motor to effect the energization of said first electromagnet to close said fluid supply means only when said armature current attains a predetermined magnitude.

6. A dishwashing machine comprising a vat, an impeller in said vat arranged to hurl a cleansing fluid upwardly and outwardly in said vat, an electric driving motor mechanically connected with said impeller, a source of cleansing fluid supply for said vat, a conduit between said source of supply and said vat, a valve in said conduit for controlling the flow of fluid to said vat, an electromagnet arranged to control the operation of said valve, an energizing circuit for said electromagnet, and electroresponsive means operated by the current supplied to said motor controlling said energizing circuit so that said valve is operated to cut off the flow of fluid to said vat only when said current attains a predetermined magnitude.

7. A dishwashing machine comprising a vat, a source of fluid supply for said vat, conduit means between said source of supply and said vat, means in said vat for engaging fluid supplied to said vat so as to circulate it in said vat, a driving motor connected to operate said fluid circulating means, valve means controlling said conduit means, means for operating said valve means to its open position to allow fluid to flow into said vat, an electromagnetic device arranged to effect the closure of said valve to shut off the supply of fluid to said vat, an energizing circuit for said electromagnetic device and means operably associated with said motor to respond to its armature current controlling said energizing circuit so that said device operates to close said valve only when said armature current attains a predetermined magnitude.

8. A dishwashing machine comprising a vat, a source of fluid supply for said vat, a conduit between said source of supply and said vat, means in said vat for engaging fluid in said vat so as to circulate it in said vat, a motor for driving said fluid circulating means, an electromagnetic device provided with an operating coil connected in series with the armature circuit of said motor and means operated by said electromagnetic device controlling said conduit means to shut off the flow of fluid from said source of fluid supply to said vat when said armature current attains a predetermined magnitude.

9. A dishwashing machine comprising a vat, a source of fluid supply for said vat, a conduit between said source of supply and said vat, means in said vat for engaging fluid therein so as to circulate it in said vat, a motor connected to operate said fluid circulating means, and electroresponsive means controlling said source of fluid supply connected to the armature circuit of said motor to respond to the armature current of said motor so as to shut off the flow of fluid to said vat only when said armature current attains a predetermined magnitude.

10. Washing apparatus comprising a vat, power operated means for engaging fluid in said vat so as to circulate it in said vat, means for controlling the quantity of fluid in said vat, and means controlling said latter means operably associated with said fluid circulating means to respond to a condition of operation thereof that varies as the quantity of fluid in said vat varies so that said fluid controlling means is operated to maintain a predetermined quantity of fluid in said vat.

11. Washing apparatus comprising a vat, means for supplying fluid to said vat, a valve controlling the quantity of fluid in said vat, fluid circulating means in said vat, a motor for operating said fluid circulating means and means controlling said valve operably associated with said motor to respond to the load imposed thereon in operating said fluid circulating means, which load increases as the quantity of fluid in said vat increases, so as to operate said valve to allow but a predetermined maximum quantity of fluid in said vat.

WILBUR L. MERRILL.